(12) United States Patent
Sun et al.

(10) Patent No.: US 10,410,379 B2
(45) Date of Patent: Sep. 10, 2019

(54) RECONSTRUCTING AN IMAGE (71) Applicant: SHENYANG NEUSOFT MEDICAL SYSTEMS CO., LTD., Shenyang (CN)

(72) Inventors: Zhipeng Sun, Shenyang (CN); Peng Gao, Shenyang (CN); Shaolian Liu, Shenyang (CN); Ming Li, Shenyang (CN)

(73) Assignee: Shenyang Neusoft Medical Systems Co., Ltd., Shenyang (CN)

( * ) Notice: Subject to any disclaimer, the term of this patent is extended or adjusted under 35 U.S.C. 154(b) by 138 days.

(21) Appl. No.: 15/612,895

(22) Filed: Jun. 2, 2017

(65) Prior Publication Data
US 2017/0365073 A1    Dec. 21, 2017

(30) Foreign Application Priority Data
Jun. 15, 2016 (CN) .......................... 2016 1 0429748

(51) Int. Cl.
*G06T 11/00* (2006.01)
(52) U.S. Cl.
CPC .......... *G06T 11/003* (2013.01); *G06T 11/005* (2013.01); *G06T 2210/41* (2013.01); *G06T 2211/424* (2013.01)
(58) Field of Classification Search
None
See application file for complete search history.

(56) References Cited

U.S. PATENT DOCUMENTS

| | | | |
|---|---|---|---|
| 6,490,476 B1 * | 12/2002 | Townsend | A61B 6/032 250/363.03 |
| 9,606,245 B1 * | 3/2017 | Czarnecki | G01T 1/2006 |
| 2003/0062482 A1 * | 4/2003 | Williams | G01T 1/17 250/363.03 |
| 2005/0205791 A1 * | 9/2005 | Bryman | G01T 1/172 250/363.03 |
| 2007/0221850 A1 * | 9/2007 | Panin | G01T 1/1617 250/363.04 |

(Continued)

FOREIGN PATENT DOCUMENTS

| CN | 104408756 A | 3/2015 |
|---|---|---|
| CN | 104541183 A | 4/2015 |

(Continued)

OTHER PUBLICATIONS

Panin, V. et al., "Normalization Coefficient Computing for Continuous Bed Motion Acquisition," Proceedings of the 2013 IEEE Nuclear Science Symposium and Medical Imaging Conference (NSS/MIC), Oct. 27, 2013, Seoul, South Korea, 10 pages.

(Continued)

*Primary Examiner* — Soo Shin
(74) *Attorney, Agent, or Firm* — McCoy Russell LLP (57) ABSTRACT

A method of reconstructing an image that may include in at least one example: determining coincidence events based on detection by a detector during a continuous incremental scanning; determining an axial position for each of the coincidence events; storing data for each of the coincidence events including the axial position in a list mode; sorting the data for each of the coincidence events according to a spatial order; and obtaining an image by performing iterative reconstruction with the sorted data for each of the coincidence events.

10 Claims, 7 Drawing Sheets

(56) References Cited

U.S. PATENT DOCUMENTS

2012/0063658 A1* 3/2012 Leroux ................ G06T 11/006
                                                     382/131

FOREIGN PATENT DOCUMENTS

WO      2014024099 A2      2/2014
WO      WO-2014024099 A2 *  2/2014  ........... G01T 1/2985

OTHER PUBLICATIONS

European Patent Office, Extended European Search Report Issued in Application No. 17175962.4, dated Oct. 25, 2017, Germany, 7 pages.

* cited by examiner

RECONSTRUCTING AN IMAGE

CROSS REFERENCE TO RELATED APPLICATIONS

The present disclosure claims priority to Chinese Patent Application No. 201610429748.2, filed on Jun. 15, 2016, the entire contents of which are incorporated herein by reference for all purposes.

TECHNICAL FIELD

The present disclosure relates to reconstructing an image.

BACKGROUND

As a Positron Emission Tomography (PET) device is limited by the factors such as hardware processing performance and manufacturing costs, its axial coverage may be not relatively large, e.g., about 15 to 20 cm. When a scanning of a large scale, for example, a whole body scan of a subject, is performed in an axial field of view, the subject lying on a scanning bed may be scanned by changing the position of the bed in a step-by-step way. Then a plurality of scanned images may be reconstructed respectively. Finally the plurality of reconstructed images may be combined together to form a whole body PET image. However, because axial sensitivity of data is not consistent during step scanning, an axial signal-to-noise ratio of the PET image may have a large fluctuation and image noise of an overlapping part may be high.

Therefore, how to improve the quality of the PET reconstructed image may be a technical problem to be solved at present.

NEUSOFT MEDICAL SYSTEMS CO., LTD. (NMS), founded in 1998 with its world headquarters in China, is a leading supplier of medical equipment, medical IT solutions, and healthcare services. NMS supplies medical equipment with a wide portfolio, including CT, Magnetic Resonance Imaging (MRI), digital X-ray machine, ultrasound, Positron Emission Tomography (PET), Linear Accelerator (LINAC), and biochemistry analyser. Currently, NMS' products are exported to over 60 countries and regions around the globe, serving more than 5,000 renowned customers. NMS's latest successful developments, such as 128 Multi-Slice CT Scanner System, Superconducting MRI, LINAC, and PET products, have led China to become a global high-end medical equipment producer. As an integrated supplier with extensive experience in large medical equipment, NMS has been committed to the study of avoiding secondary potential harm caused by excessive X-ray irradiation to the subject during the CT scanning process.

BRIEF DESCRIPTION OF DRAWINGS

The details of one or more embodiments of the subject matter described in the present disclosure are set forth in the accompanying drawings and description below. Other features, aspects, and advantages of the subject matter will become apparent from the description, the drawings, and the claims. Features of the present disclosure are illustrated by way of example and not limited in the following figures, in which like numerals indicate like elements.

DETAILED DESCRIPTION

Exemplary examples will be described in detail herein, examples of which may be illustrated in the accompanying drawings. The following description refers to the accompanying drawings in which same numbers in the different drawings may represent the same or similar elements unless otherwise represented. The implementations described in the following exemplary examples do not represent all implementations consistent with the present disclosure. In contrast, they are merely examples of devices and methods consistent with some aspects of the present disclosure as recited in the appended claims.

The terms used in the present disclosure is for the purpose of describing particular examples only, and is not intended to limit the present disclosure. The singular forms such as "a", "said", and "the" used in the present disclosure and the appended claims are also intended to include plural forms, unless otherwise meaning is clearly indicated in the context. It may be further understood that the term "and/or" as used herein refers to any or all possible combinations that include one or more associated listed items.

It may be understood that although various information may be described by using the terms such as first, second, third, etc. in the present disclosure, this information should not be limited to these terms. These terms are used only to distinguish the same type of information from each other. For example, the first information may also be referred to as the second information without departing from the scope of the present disclosure, and similarly, the second information may also be referred to as the first information. Depending on the context, in addition, the used word "if" may be interpreted as "when" or "as" or "in response to".

Figure 1:
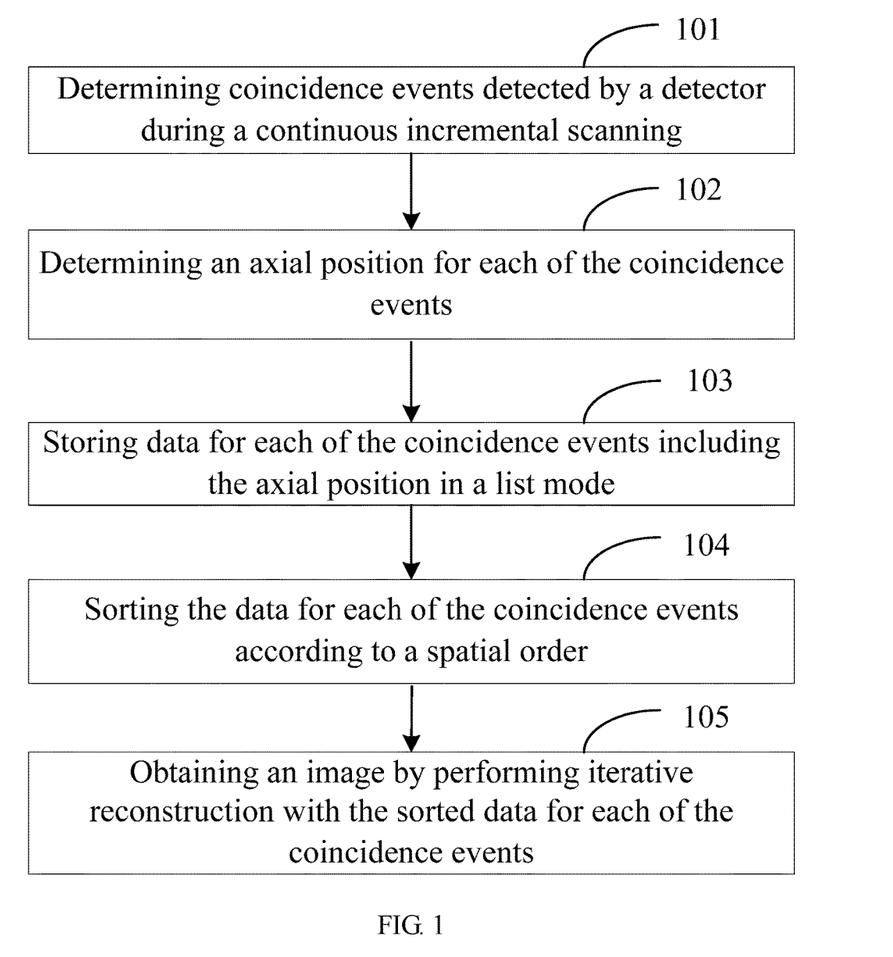
FIG. 1 is a flowchart of a method of reconstructing an image according to an example of the present disclosure.

Refer to FIG. 1, which is a flowchart of a method of reconstructing an image based on a list mode according to an example of the present disclosure. The medical device of the present disclosure may take a PET device as an example and the method of reconstructing an image may include the following blocks 101-105.

At block 101, coincidence events detected by a detector during a continuous incremental scanning may be determined.

In an example, a determining method is as follows: during the continuous incremental scanning, when the detector in a front-end system (in the present disclosure, taking the front-end system including a clock system, a scanning bed system and a detector system as an example, wherein the detector system may also be referred to as a gantry system) receives a master clock signal, it may begin to collect a pair of photons and mark time information of the pair of photons detected by the detector.

Herein the master clock signal may be given by the clock system. For example, the clock system may provide the master clock signal for the front-end system to work, and simultaneously output the master clock signal to the detector system, the scanning bed system and the like of the front-end system to use. In this way, the detector system and the scanning bed system may use the same master clock signal. In the example, the master clock signal may also be referred to as a synchronous clock.

Then, it may be determined whether the time information of the pair of photons detected by the detector meets a coincidence event condition, for example, a coincidence time window. If yes, it may be determined that a coincidence event is detected; otherwise, it may be determined that a non-coincidence event is detected.

Figure 2:
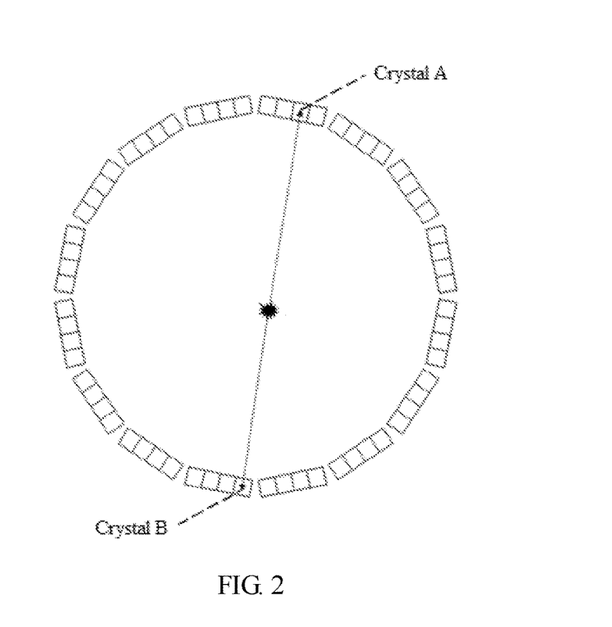
FIG. 2 is a schematic diagram of a pair of photons detected by a crystal A and a crystal B of a detector according to an example of the present disclosure.

In an example, if a positron annihilation event occurs in the detector of the detector system, two back-to-back photon signals (i.e., a pair of photons) may be emitted, which may be detected by a crystal A and a crystal B of the detector, respectively. As shown in FIG. 2, it is a schematic diagram of a pair of photons detected by the crystal A and the crystal B of the detector according to an example of the present disclosure. Herein, a line connecting the crystal A and the crystal B may be called a line of response. If a back-end server determines that a time difference in which the two detected photon signals arrive at the detector is within the coincidence time window (generally less than a few nanoseconds), the positron annihilation event may be considered a coincidence event; otherwise, it may be called a non-coincidence event.

Data for each of the coincidence events may include four parameters: an axial slant angle index, a radial angle index, an axial position, and a radial position index. Herein, it is well known to those skilled in the art to determine the axial slant angle index, the radial angle index and the radial position index, and further description is omitted for brevity.

It should be noted that an axial position of a coincidence event in the present disclosure is an actual position of the scanning bed.

At block 102, an axial position for each of the coincidence events may be determined.

A method of determining an axial position for each of the coincidence events is as follows. When the scanning bed system in the front-end system receives the master clock signal, the scanning bed may move continuously in accordance with a setting requirement and a current axial position of the scanning bed may be determined according to a number of pulses of the master clock signals. An axial position of a coincidence event may be determined with respect to the scanning bed. For example, the axial position of the coincidence event may indicate an axial position of the scanning bed when the detector detects the coincidence event. Therefore, in the present disclosure, the axial position of the coincidence event may be regarded as an actual axial position of the scanning bed.

Figure 3:
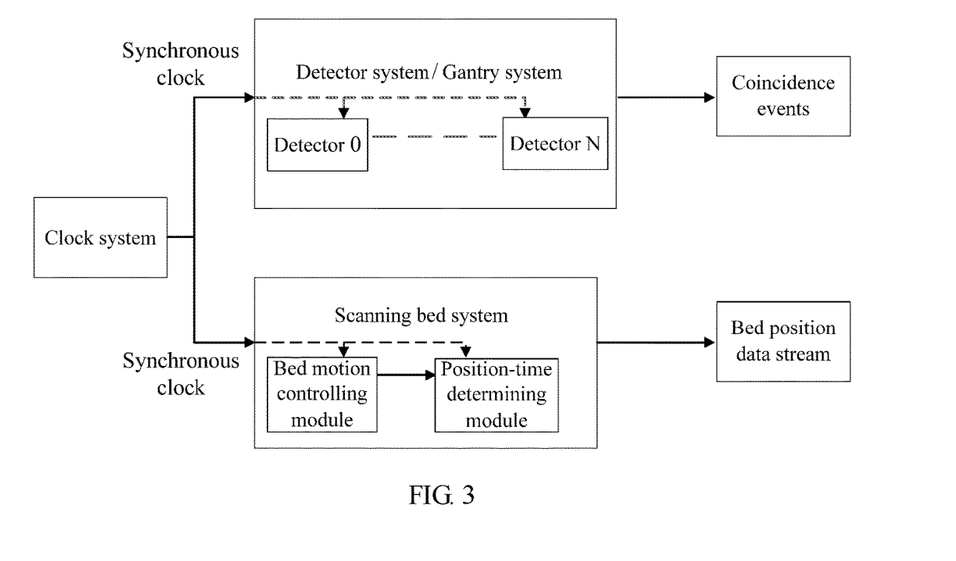
FIG. 3 is a structure schematic diagram of a front-end system according to an example of the present disclosure.

In an example, the clock system may provide the master clock signal for the front-end system to work, and divide the master clock signal into two streams, thereby simultaneously providing the two streams to detector system (i.e., the gantry system) and the scanning bed system to use. As shown in FIG. 3, it is a structure schematic diagram of the front-end system according to an example of the present disclosure.

The entire front-end system may take the master clock signal provided by the clock system as a reference to mark time information. The operation may be as follows.

1) When the entire front-end system is powered on, the clock system may start to work first and provide the master clock signal required by various sub-systems (including the detector system, the scanning bed system and the like) when receiving a command to begin scanning.

2) When receiving the master clock signal, the detector system may begin detecting a pair of photons and marking time information.

When the detector in the detector system detects a pair of photons, it may measure a time difference between a first timing at which the pair of photon pair is detected and a second timing for a rising edge of the master clock signal which is the nearest to the first timing. This time difference plus the second timing for the rising edge of the master clock signal may be a timing at which the photon pair is detected. The time difference may be used to synchronize the scanning bed system and the detector system, mark the timing for each of the coincidence events and determine an axial position of each of the coincidence events.

3) When receiving the master clock signal, a bed motion controlling module in the scanning bed system may control the scanning bed to move according to the setting requirement.

In an example, a distance traveled by the scanning bed each pulse of the master clock signal may be set in advance. For example, it may be set that the scanning bed moves 1 mm every 10 pulses of the master clock signal. When the bed motion controlling module receives the master clock signal, it may control the scanning bed to move. For example, the scanning bed may move 0.1 mm each pulse of the master clock signal. A position-time determining module may determine a current axial position of the scanning bed by recording a number of pulses of the master clock signal. All current axial positions of the scanning bed during the movement may be referred to as a bed position data stream. For example, a current axial position of the scanning bed may be obtained in a way that the number of pulses of the master clock signal is multiplied by the distance traveled by the scanning bed in a single pulse of the master clock signal.

Figure 4:
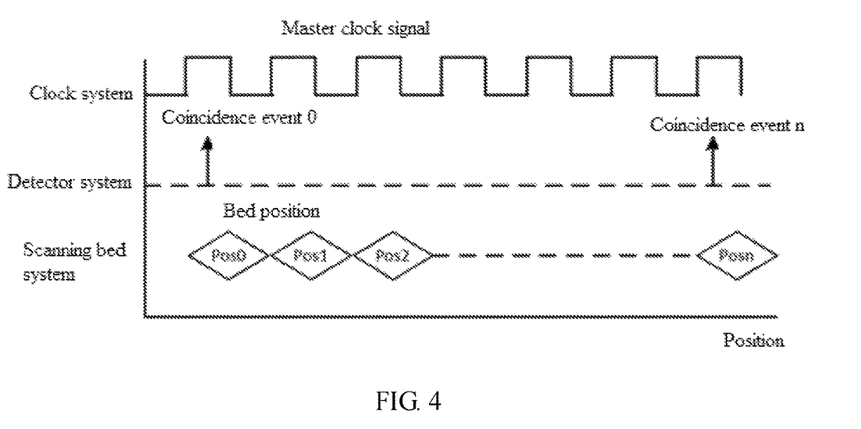
FIG. 4 is a schematic diagram of a method of determining an actual axial position of a scanning bed according to an example of the present disclosure.

4) During a synchronization process, an uploaded coincidence event may include relevant information of the master clock signal, i.e., each of the coincidence events may correspond to a timing determined from the master clock signal. At the same time, a correction table of scanning bed position-coincidence event timing may be obtained according to position/master clock signal provided by the scanning bed system. The correction table may be a time offset, for example, the time difference mentioned in 2). The correction table may be used to correct an axial position of the scanning bed. There may be a time difference between a first timing at which the detector detects a coincidence event and a second timing for a rising edge of the master clock signal which is the nearest to the first timing. In this way, there may be a distance difference between an axial position of the coincidence event and an actual position of the scanning bed corresponding to the coincidence event. In order to synchronize both of them, an axial position of the scanning bed may be corrected. As shown in FIG. 4, it is a schematic diagram of a method of determining an actual axial position of the scanning bed according to an example of the present disclosure.

In an example, a PET device that supports detecting coincidence event during the continuous incremental scanning may obtain an axial position of the scanning bed in real-time.

At block 103, data for each of the coincidence events including the axial position may be stored in a list mode.

In an example, each of the coincidence events including the axial position may be stored in the list mode in a storage medium such as a memory, a magnetic disk and the like. Herein, the list mode in the example is as follows.

Event 1 includes [an axial slant angle index, a radial angle index, an axial position, and a radial position index].

Event 2 includes [an axial slant angle index, a radial angle index, an axial position, and a radial position index].

Event N includes [an axial slant angle index, a radial angle index, an axial position, and a radial position index].

It should be noted that an axial position for each of the above events is an actual axial position of the scanning bed. The actual axial position the scanning bed is a float.

Compared with another list mode [an axial slant angle index, a radial angle index, an axial position index, and a radial position index], since a third dimension parameter is changed from a discrete axial position index to an actual axial position corresponding to the current scanning bed while the event is recorded, the list mode in the present disclosure may effectively ensure the accuracy of an axial position for each of the coincidence events. Although the size of the memory occupied by each of the coincidence events increases relatively, because of the sparseness of the data itself, it still has a greater advantage over another list mode in terms of storing and computing redundancy.

At block 104, the data for each of the coincidence events may be sorted according to a spatial order.

In the present disclosure, the data for each of the coincidence events stored in the list mode may be sorted according to a spatial order. Where, the sorting may be performed based on a projection algorithm of an axial position.

Figure 5:
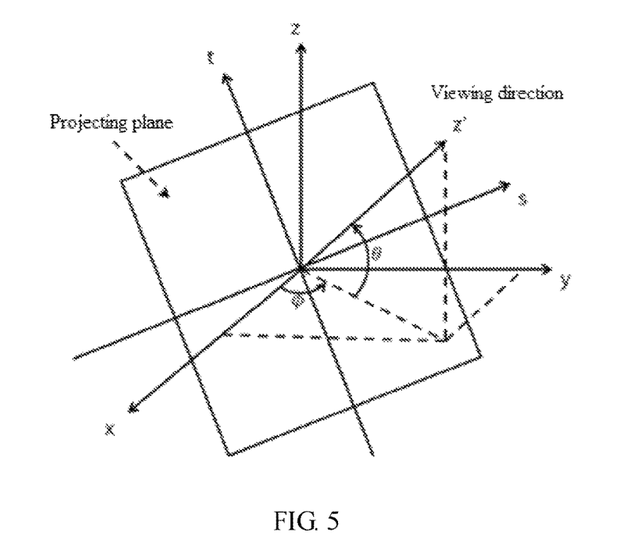
FIG. 5 is a schematic diagram of a spatial coordinate rotation according to an example of the present disclosure.

A projection algorithm is well known to those skilled in the art. When a forward projection of a three-dimensional multi-slice image is performed along a spatial unit vector ($\varphi$, $\theta$), a two-dimensional projection may be obtained. As shown in FIG. 5, it is a schematic diagram of spatial coordinate rotation in a projection algorithm according to an example of the present disclosure. A pixel position of the three-dimensional image may be represented by a coordinate (x, y, z). A direction of a spatial unit vector may be represented by an axial slant angle $\theta$ and a radial angle $\varphi$ in the list mode. The two-dimensional projection may be represented by a coordinate system s-t-z'. Because the data in the projection process is along the z' direction, z' here may not only represent a normal vector of the s-t plane, but also may be used as a determining method for a distance between a pixel point and a centre of a Field of View (FOV). The projecting plane and the viewing direction are shown in FIG. 5.

According to a rotation relationship of a spatial coordinate system, the following formula may be obtained:

$$\begin{cases} x = -s \cdot \sin\theta - t \cdot \sin\theta\cos\varphi + z'\cos\theta\cos\varphi \\ y = s \cdot \cos\theta - t \cdot \sin\theta\sin\varphi + z'\cos\theta\sin\varphi \\ z = t \cdot \cos\theta + z'\sin\theta \end{cases}.$$

Figure 6:
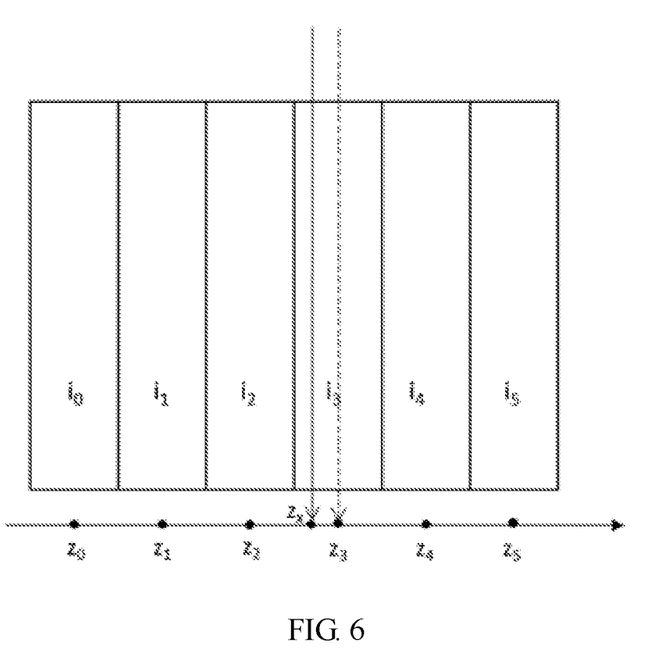
FIG. 6 is a schematic diagram of a projection algorithm according to an example of the present disclosure.

According to a technical solution of an axial position index (hereinafter referred to as the axial position index solution), an axial position of a coincidence event as shown in FIG. 6 may be recorded at $Z_3$ (in the present disclosure, the axial position of the coincidence event may be recorded at $Z_x$). FIG. 6 is a schematic diagram of a projection algorithm according to an example of the present disclosure. This may result in an error of $(Z_3-Z_x)*$slice thickness in the axial position of the coincidence event. In a forward projection and a backward projection, this coincidence event may be recorded at $Z_3$ and the reconstructed image may have an axial deviation. The axial deviation of the axial position index solution may be estimated by spatial geometry herein.

The axial deviation of the axial position index solution may be represented by a variable t, which may be denoted as |Δt|<0.5. Because the axial slant angle $\theta$ is very small and near 0, the influence of Δt on x coordinate value and y coordinate value is very small and is almost negligible; and the influence on z coordinate value is relatively large, which fluctuates between +/−0.5 number of axial pixel widths. Therefore, the axial deviation range of the axial position index solution in terms of precision may be obtained.

In the present disclosure, the axial position of the coincidence event is not a value estimated based on an index, but an actual determined value. In the forward projection and the backward projection, this coincidence event is related to both $Z_2$ and $Z_3$. According to a linear interpolation method, a relation weight between this coincidence event and an image slice $i_2$ is $(Z_3-Z_x)/(Z_3-Z_2)$ and the relation weight may be allocated to $Z_2$; and a relation weight between this coincidence event and an image slice $i_3$ is $(Z_x-Z_2)/(Z_3-Z_2)$ and the relation weight may be allocated to $Z_3$. In the present disclosure, there is no artificially introduced error, i.e., |Δt|=0. Therefore, the technical solution provided by the present disclosure does not have an error in terms of precision, thereby improving the quality of the reconstructed image.

Herein the axial position projection manner is not limited to the above manner. The same operation may be completed by a bilinear interpolation, a polynomial interpolation and so on.

At block 105, an image may be obtained by performing iterative reconstruction with the sorted data for each of the coincidence events.

Herein those skilled in the art may use any well-known technology to perform iterative reconstruction, and further description is omitted here for brevity.

In examples of the present disclosure, the axial position for each of the coincidence events may be recorded one by one by an improved list mode, a projection method and a method of obtaining an actual axial position corresponding to the scanning bed, thereby fundamentally avoiding the possibility of introducing an axial error so that position and shape of the reconstructed image are more accurate.

Figure 7:
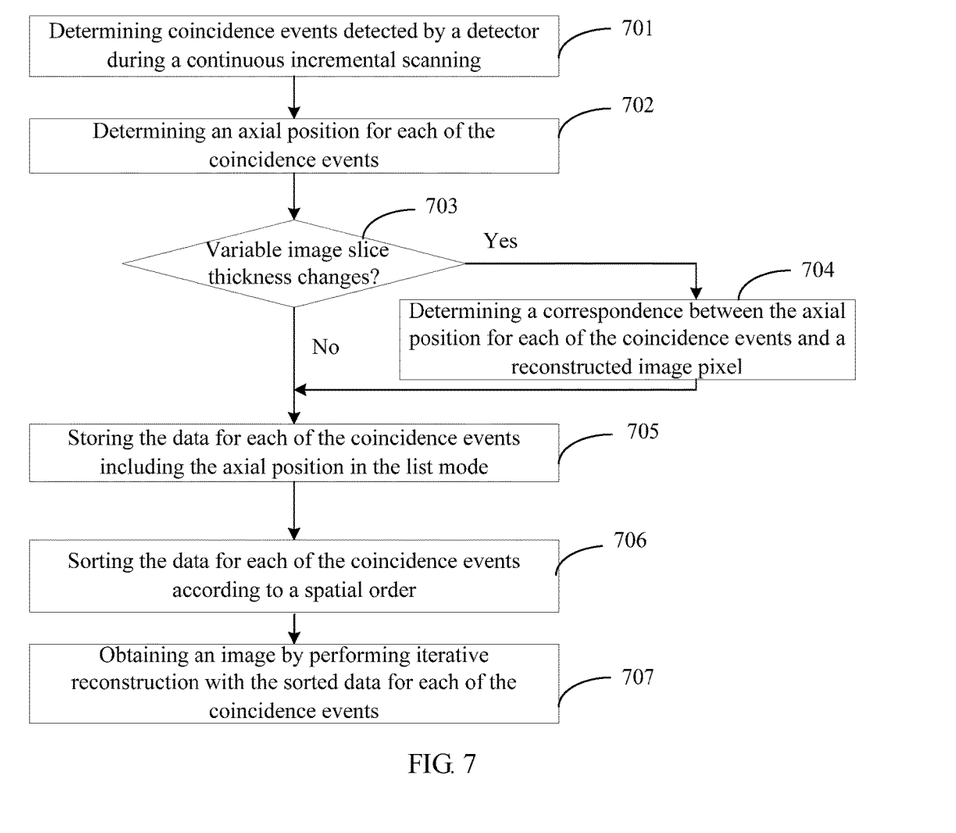
FIG. 7 is a flow diagram of a method of reconstructing an image according to in another example of the present disclosure.

Please refer to FIG. 7, which is a flow diagram of a method of reconstructing PET image according to another example of the present disclosure. The method includes the following blocks 701-707.

At block 701, coincidence events detected by a detector during a continuous incremental scanning may be determined.

At block 702, an axial position for each of the coincidence events may be determined.

Blocks 701 and 702 are the same as blocks 101 and 102, respectively, and please see above for more detail, which will not be described again here.

At block 703, it may be determined whether a variable image slice thickness changes or not. If yes, block 704 may be performed; otherwise, block 705 may be performed directly.

Herein, it may be determined whether the inputted variable image slice thickness is the same as a default variable image slice thickness. If yes, it may be determined that the variable image slice thickness does not change; otherwise, it may be determined that the variable image slice thickness changes.

At block 704, a correspondence between the axial position for each of the coincidence events and a reconstructed image pixel may be determined.

In this block, when the variable image slice thickness changes, the variable image slice thickness and an axial position for each of the slices may be determined first. Where, the axial position for each of the slices may be a center for each of the slices. For example, if the variable image slice thickness is 5 mm, an axial position of a first slice may be 2.5 mm, an axial position of a second slice may be 7.5 mm. Then, the axial position for each of the coincidence events may be projected onto an axial position for each of the slices in the reconstructed image to obtain the correspondence between the axial position for each of the coincidence events and a reconstructed image pixel.

At block 705, data for each of the coincidence events including the axial position may be stored in the list mode.

At block 706, the data for each of the coincidence events stored in the list mode may be sorted according to a spatial order.

At block 707, a PET image may be obtained by performing iterative reconstruction with the sorted data for each of the sorted coincidence events.

In an example, in a sinogram-based solution or the axial position index solution, the image slice thickness may be half of an axial width of a crystal, and a number of slices may be two times of a number of axial crystal rings minus one, i.e., the number of slices=the number of axial crystal rings*2−1. In the present disclosure, since the axial position for each of the coincidence events is an actual value, the image slice thickness may be any size in theory.

Corresponding to examples of the above method of reconstructing an image, the present disclosure further provides a device for reconstructing an image according to an example.

Figure 8:
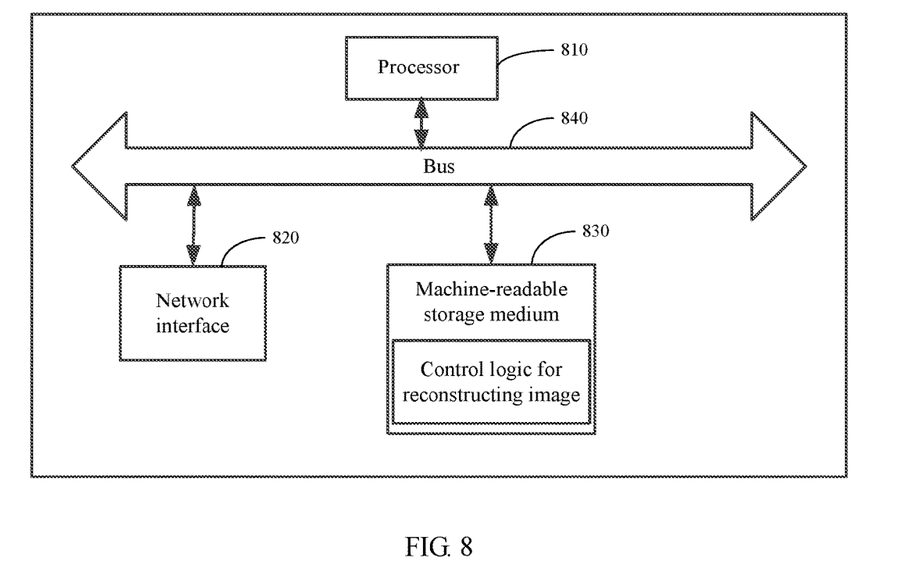
FIG. 8 is a hardware structure diagram of a device for reconstructing an image according to an example of the present disclosure.

The device for reconstructing an image provided in the present disclosure may be applied to a medical device. Device examples may be implemented by software, or may be implemented by hardware or by a combination of hardware and software. From the hardware level, as shown in FIG. 8, it is a hardware structure diagram of a device for reconstructing an image according to an example of the present disclosure. In addition to a processor 810, a network interface 820, a machine-readable storage medium 830 and an internal bus 840 shown in FIG. 8, the device for reconstructing an image may further include other hardware according to actual functions, and detailed description is omitted for brevity.

In different examples, the machine-readable storage medium 830 may be a Read-Only Memory (ROM), a volatile memory, a non-volatile memory, a flash memory, a storage drive (e.g., a hard disk drive), a solid state drive, any type of storage disks (such as an optical disk, a DVD, etc.), or a similar storage medium, or a combination thereof.

Figure 9:
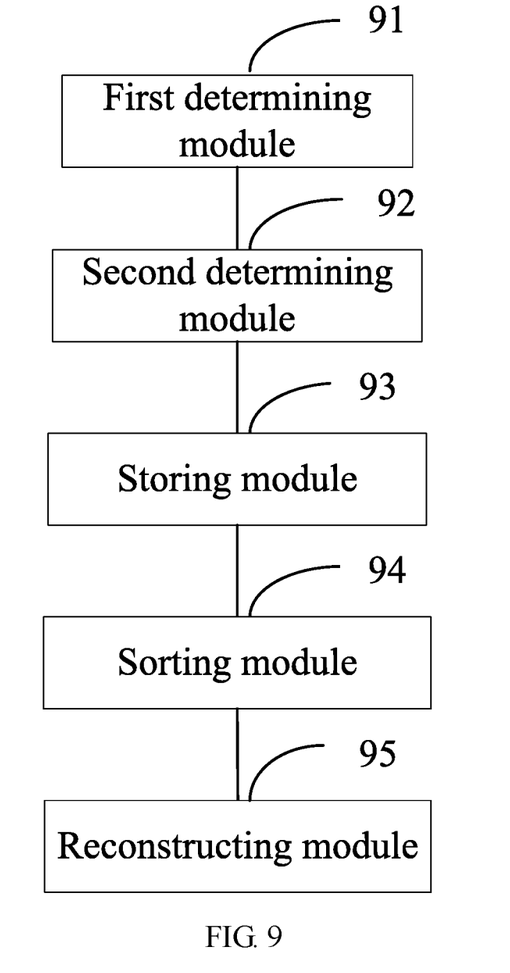
FIG. 9 is a block diagram of a control logic for reconstructing an image according to an example of the present disclosure.

Further, the machine-readable storage medium 830 may store a control logic for reconstructing an image. As shown in FIG. 9, divided by functions, the control logic for reconstructing an image may include a first determining module 91, a second determining module 92, a storing module 93, a sorting module 94 and a reconstructing module 95.

The first determining module 91 may be configured to determine coincidence events detected by a detector during a continuous incremental scanning.

The second determining module 92 may be configured to determine an axial position for each of the coincidence events.

The storing module 93 may be configured to store data for each of the coincidence events including the axial position in a list mode.

The sorting module 94 may be configured to sort the data for each of the coincidence events according to a spatial order.

The reconstructing module 95 may be configured to obtaining an image by performing iteratively reconstruction with the sorted data for each of the coincidence events.

In another example, the first determining module includes a first determining sub-module, a detecting sub-module, a marking sub-module, a second determining sub-module and a third determining sub-module.

The first determining sub-module may be configured to determine whether the detector receives a master clock signal during a continuous incremental scanning or not.

The detecting sub-module may be configured to begin detecting a pair of photons when the first determining sub-module determines that the detector has received the master clock signal.

The marking sub-module may be configured to mark time information on the pair of photons detected by the detecting sub-module.

The second determining sub-module may be configured to determine whether the marked time information for the pair of photons meets a coincidence time window or not. When the marked time information for the pair of photons meets a coincidence time window, the second determining sub-module may determine that a coincidence event is detected.

In another example, the second determining module may include a determining sub-module.

The determining sub-module may be configured to determine an actual axial position of the scanning bed based on a master clock signal and the axial position for each of the coincidence events according to the actual axial position of the scanning bed.

The sorting module may be configured to sort the data for each of the coincidence events stored in the list mode according to a spatial order.

In another example, the control logic for reconstructing an image may further include a third determining module.

The third determining module may be configured to determine whether a variable image slice thickness changes or not; if yes, the storing module 93 may be configured to store the data for each of the coincidence events including the axial position in the list mode when a correspondence between the axial position for each of the coincidence events and a reconstructed image pixel; and if not, the storing module 93 may be directly configured to store the data for each of the coincidence events including the axial position in the list mode.

The examples below may be implemented with software, which may further describe how the device for reconstructing an image runs the control logic. In an example, the control logic of the present disclosure may be understood as machine executable instructions stored in the machine readable storage medium 830. When the processor 810 of the device for reconstructing an image in the present disclosure executes the control logic, the processor 810 may execute corresponding machine executable instructions of the control logic stored on the machine readable storage medium 830 to:

determine coincidence events detected by a detector during a continuous incremental scanning in which a scanning bed continuously moves;

determine an axial position for each of the coincidence events;

store data for each of the coincidence events including the axial position in a list mode;

sort the data for each of the coincidence events according to a spatial order; and obtain an image by performing iterative reconstruction with the sorted data for each of the coincidence events.

In an example, when determining coincidence events detected by the detector during the continuous incremental scanning, the machine-executable instructions cause the processor to mark time information of a pair of photons detected by the detector during the continuous incremental scanning according to a master clock signal; and determine that a coincidence event is detected when the marked time information for the pair of photons meets a coincidence time window.

In an example, when determining determining the axial position for each of the coincidence events, the machine-executable instructions cause the processor to determine an actual axial position of the scanning bed based on a master clock signal and determine the axial position for each of the coincidence events according to the actual axial position of the scanning bed.

In an example, when determining the actual axial position of the scanning bed based on the master clock signal, the machine-executable instructions cause the processor to determine an axial position of the scanning bed based on a number of pulses of the master clock signal; determine a time difference between a first timing at which the detector detects the coincidence event and a second timing for a rising edge of the master clock signal which is the nearest to the first timing; and obtain the actual axial position of the scanning bed by correcting the axial position of the scanning bed according to the time difference.

In an example, when sorting the data for each of the coincidence events according to the spatial order, the machine-executable instructions cause the processor to sort the data for each of the coincidence events with a projection algorithm.

In an example, the machine-executable instruction further causes the processor to: determine whether a variable image slice thickness changes or not; store the data for each of the coincidence events including the axial position in the list mode when a correspondence between the axial position for each of the coincidence events and a reconstructed image pixel is determined in a case that the variable image slice thickness changes; and store the data for each of the coincidence events including the axial position in the list mode in a case that the variable image slice thickness does not change.

Here the data for each of the coincidence events includes an axial slant angle index, a radial angle index, the axial position and a radial position index of the coincidence event.

It shall be noted that the detector in the present embodiment may be a PET detector and a reconstructed image may be a PET image.

For the device examples, since they substantially correspond to the method examples, the correlations therebetween may refer to part of the method examples. The device examples described above are merely illustrative, wherein units described as separate components may be or may not be physically separated, and components displayed as units may be or may not be physical units, i.e., may be located in one place, or may be distributed to a plurality of network elements. Part or all of the modules may be selected according to actual requirements to achieve the purpose of the solution of the present disclosure. Those skilled in the art will understand and implement it without creative work.

The examples set forth above are only illustrated as preferred examples of this disclosure and are not intended to limit this disclosure. All modifications, equivalent substitutions and improvements made within the spirit and principles of this disclosure shall fall within the protection scope of this disclosure.

The invention claimed is:

1. A method of reconstructing a PET image, comprising:
receiving a master clock signal;
determining coincidence events detected by a detector during a continuous incremental scanning in which a scanning bed continuously moves;
for each of the coincidence events,
determining a time difference between a first timing at which the detector detects the coincidence event and a second timing for a rising edge of the master clock signal which is nearest to the first timing;
determining an actual axial position of the scanning bed at which the coincidence event is detected based on the master clock signal and the time difference corresponding to the coincidence event;
determining an axial position for the coincidence event, wherein the axial position of the coincidence event is represented by the actual axial position of the scanning bed at which the coincidence event is detected;
storing data for each of the coincidence events comprising the axial position in a list mode;
sorting the data for each of the coincidence events according to a spatial order; and
obtaining the PET image by performing iterative reconstruction with the sorted data for each of the coincidence events;
wherein the method further comprises:
determining whether a variable image slice thickness changes or not;
storing the data for each of the coincidence events comprising the axial position in the list mode when a correspondence between the axial position for each of the coincidence events and a reconstructed image pixel is determined in a case that the variable image slice thickness changes; and
storing the data for each of the coincidence events comprising the axial position in the list mode in a case that the variable image slice thickness does not change.

2. The method according to claim 1, wherein the determining coincidence events detected by the detector during the continuous incremental scanning comprises:
marking time information of a pair of photons detected by the detector during the continuous incremental scanning according to the master clock signal; and
determining that the coincidence event is detected when the marked time information for the pair of photons meets a coincidence time window.

3. The method according to claim 1, wherein the determining the actual axial position of the scanning bed at which the coincidence event is detected based on the master clock signal and the time difference corresponding to the coincidence event comprises:

determining an axial position of the scanning bed based on a number of pulses of the master clock signal; and obtaining the actual axial position of the scanning bed by correcting the axial position of the scanning bed according to the time difference.

4. The method according to claim 1, wherein the sorting the data for each of the coincidence events according to the spatial order comprises:

sorting the data for each of the coincidence events with a projection algorithm.

5. The method according to claim 1, wherein the data for each of the coincidence events comprises an axial slant angle index, a radial angle index, the axial position, and a radial position index of the coincidence event.

6. A device for reconstructing a PET image, comprising: a processor and a machine-readable storage medium, wherein by invoking and executing machine-executable instructions corresponding to a control logic for reconstructing the PET image stored on the machine-readable storage medium, the processor is caused to:

receive a master clock signal;

determine coincidence events detected by a detector during a continuous incremental scanning in which a scanning bed continuously moves;

for each of the coincidence events, determine a time difference between a first timing at which the detector detects the coincidence event and a second timing for a rising edge of the master clock signal which is nearest to the first timing;

determine an actual axial position of the scanning bed at which the coincidence event is detected based on the master clock signal and the time difference corresponding to the coincidence event;

determine an axial position for the coincidence event, wherein the axial position of the coincidence event is represented by the actual axial position of the scanning bed at which the coincidence event is detected;

store data for each of the coincidence events comprising the axial position in a list mode;

sort the data for each of the coincidence events according to a spatial order; and obtain the PET image by performing iterative reconstruction with the sorted data for each of the coincidence events;

wherein the machine-executable instructions further cause the processor to:

determine whether a variable image slice thickness changes or not;

store the data for each of the coincidence events comprising the axial position in the list mode when a correspondence between the axial position for each of the coincidence events and a reconstructed image pixel is determined in a case that the variable image slice thickness changes; and store the data for each of the coincidence events comprising the axial position in the list mode in a case that the variable image slice thickness does not change.

7. The device according to claim 6, wherein when determining coincidence events detected by the detector during the continuous incremental scanning, the machine-executable instructions cause the processor to:

mark time information of a pair of photons detected by the detector during the continuous incremental scanning according to the master dock signal; and determine that the coincidence event is detected when the marked time information for the pair of photons meets a coincidence time window.

8. The device according to claim 6, wherein when determining the actual axial position of the scanning bed at which the coincidence event is detected based on the master clock signal and the time difference corresponding to the coincidence event, the machine-executable instructions cause the processor to:

determine an axial position of the scanning bed based on a number of pulses of the master clock signal; and obtain the actual axial position of the scanning bed by correcting the axial position of the scanning bed according to the time difference.

9. The device according to claim 6, wherein when sorting the data for each of the coincidence events according to the spatial order, the machine-executable instructions cause the processor to:

sort the data for each of the coincidence events with a projection algorithm.

10. The device according to claim 6, wherein the data for each of the coincidence events comprises an axial slant angle index, a radial angle index, the axial position, and a radial position index of the coincidence event.

* * * * *